United States Patent [19]

Sekiguchi et al.

[11] Patent Number: 5,041,182

[45] Date of Patent: Aug. 20, 1991

[54] METHOD OF MANUFACTURING COMPOSITE MATERIAL BLADE

[75] Inventors: Takashi Sekiguchi; Yasuto Nishiwaki, both of Tochigi, Japan

[73] Assignee: Fuji Jukogyo Kabushiki Kaisha, Tokyo, Japan

[21] Appl. No.: 584,727

[22] Filed: Sep. 18, 1990

[30] Foreign Application Priority Data

Sep. 20, 1989 [JP] Japan .................................. 1-243667

[51] Int. Cl.$^5$ .............................................. B29C 65/02
[52] U.S. Cl. .................................. 156/245; 29/889.71; 264/251; 264/255; 264/258; 264/259
[58] Field of Search .......... 156/245; 29/889.6, 889.61, 29/889.71; 416/229 R, 230; 264/250, 251, 255, 257, 258, 259, 294, 317, 336

[56] References Cited

U.S. PATENT DOCUMENTS

| | | | |
|---|---|---|---|
| 2,423,700 | 7/1947 | Hardy | 29/889.6 |
| 3,802,975 | 4/1974 | Saidla | 156/245 |
| 4,095,322 | 6/1978 | Scarpati et al. | 156/245 |

*Primary Examiner*—Jill L. Heitbrink

*Attorney, Agent, or Firm*—Beveridge, DeGrandi & Weilacher

[57] ABSTRACT

In manufacturing a composite material blade for a helicopter, for example, an upper and a lower dummy skins are disposed on molding surfaces of an upper and a lower mold halves. A dummy block provided with a preliminarily hardened vertical rib and having an outer shape corresponding to the molding surface of the lower mold half is also disposed. A lower portion of a spar is joined to a lower surface front edge cover and the vertical rib and a rear edge reinforcing member is joined to the lower surface rear edge cover. An annular reinforcing member and a front edge block are disposed on the lower portion of the spar and an upper portion of the spar is disposed on the annular reinforcing member and the front edge block. In this state, the upper and the lower mold halves are closed and thermo-setting treatment is performed to the closed mold assembly. After that, the upper and the lower surface dummy skins and the dummy block are removed, and the actual upper and lower skins and the core member are disposed in the mold halves, which are closed and subjected to thermo-setting treatment.

12 Claims, 7 Drawing Sheets

METHOD OF MANUFACTURING COMPOSITE MATERIAL BLADE

BACKGROUND OF THE INVENTION

The present invention relates to a method of manufacturing a blade constituted of composite materials adapted for a rotary wing of a helicopter.

A conventional technology for manufacturing a composite material blade is disclosed in, for example, Japanese Patent Publication No. 58-4679, in which a main spar member and a hollow expandable member are arranged between upper and lower skins made of a resin located in a mold assembly in a condition where the main spar member and the hollow expandable member are enclosed by a band-like member. The skins are then subjected to thermo-setting treatment, while applying pressure to the interior of the hollow expandable member, to integrate the main spar, the hollow expandable member and the skins.

This conventional composite material blade manufacturing method requires accurate control of the pressure to be applied. Further, in an adverse case, a core member arranged between the upper and lower skins may be crushed by the high pressure in the hollow expandable member. In addition, since a reinforcing member is merely disposed, without being fixed, to a predetermined position in the molding operation period, the reinforcing member may be pushed outward by the compression force of a mold assembly after closing the mold assembly, resulting in crushing the core member.

Another conventional technology is disclosed in, for example, Japanese Patent Laid-open Publication No. 60-234833, in which an outer skin structure and a hollow inner mold having a closed section in which a core member is disposed, are arranged on molding surfaces of a mold assembly and a compression force is then applied to the core member by the mold assembly to integrally form the outer skin structure, the inner mold and the core member while applying pressure and heat thereto.

In this method, substantially the same problems as that of the first conventional method will be encountered.

A further conventional technology is disclosed in, for example, Japanese Patent Laid-open Publication No. 60-166592, in which an elongated member preliminarily formed by thermo-setting treatment in a specific mold assembly is prepared and the elongated member is integrally formed with a rear side mold member formed independently from the elongated member with an outer cover by a joint coupling technique.

In this conventional blade manufacturing method, at least two mold assemblies are required, resulting in the increase of manufacturing cost. In addition, the products thus manufactured may have variable dimensions and shapes due to the manufacturing errors in the mold assemblies, thus making it difficult to increase the quality of the products.

SUMMARY OF THE INVENTION

An object of the present invention is to substantially eliminate defects or drawbacks encountered in the prior art described above and to provide a method of manufacturing a blade constituted by composite materials with high precision and having substantially no strain and deformation by utilizing a dummy block and forming the blade in accordance with two series of manufacturing steps.

This and other objects can be achieved by the present invention by providing a method of manufacturing a blade member constituted by composite materials comprising the steps of: preparing a mold assembly provided with an upper and a lower mold halves, each having an inner molding surface, disposing an upper dummy skin, an upper surface leading edge cover and an upper surface trailing edge cover on the molding surface of the upper mold half, disposing a lower dummy skin, a lower surface leading edge cover and a lower surface trailing edge cover on the molding surface of the lower mold half, disposing, on the lower dummy skin between the lower surface leading edge cover and the lower surface trailing edge cover, a dummy block provided with a preliminarily hardened vertical rib on the front end thereof and having an outer shape corresponding to the molding surface of the lower mold half, joining a lower member of a spar to the lower surface leading edge cover and the vertical rib and joining a trailing edge reinforcing member to the lower surface trailing edge cover, disposing an annular reinforcing member and a leading edge block on the lower member of the spar and disposing an upper member of the spar on the annular reinforcing member and the leading edge block, closing the upper and the lower mold halves to perform thermo-setting treatment to the closed mold assembly, opening the mold assembly, changing the upper dummy skin on the molding surface of the upper mold half to an upper surface skin, changing the lower dummy skin and the dummy block on the molding surface of the lower mold to a lower surface skin and a core member, respectively, and closing the upper and lower molding halves to perform thermo-setting treatment to the closed mold assembly.

According to composite material blade manufacturing method of the character described above, the dummy block is used in place of an actual core in the first series of steps to prevent the leading and trailing edge assemblies disposed to the leading and trailing edge portions of the mold assembly from being pushed outward or crushed by the compression force of the mold assembly when closed. In the second series of steps, the dummy block is removed and the actual core is arranged in the mold assembly for preventing the core from being crushed and for producing the blade member with accurate dimensions and shape when the final working process such as thermo-setting treatment is carried out.

DESCRIPTION OF THE PREFERRED EMBODIMENT

A preferred embodiment of the present invention will become understood from the following detailed description referring to the accompanying drawings.

Figure 1:
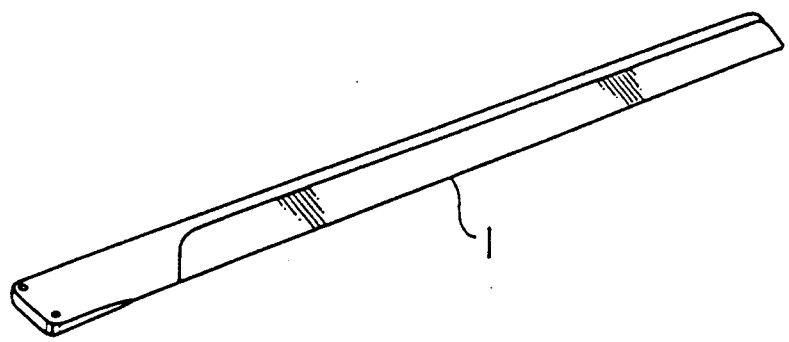
FIG. 1 is a perspective view of a rotary wing of a helicopter produced by a composite material blade manufacturing method according to the present invention.
Figure 2:
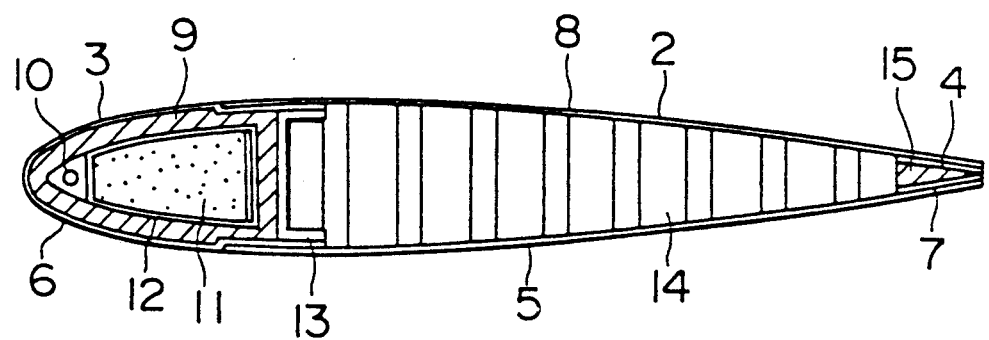
FIG. 2 is a sectional view in an enlarged scale of the rotary wing shown in FIG. 1.

FIG. 1 is a perspective view of one rotary wing of a helicopter produced by the composite material blade manufacturing method according to the present invention. The rotary wing 1 shown in FIG. 1 comprises, as shown in FIG. 2, an outer structure 8, a main spar 9, a leading edge block 10, an annular reinforcing member 12 with a core made of a foaming material 11, a vertical rib 13, a core member 14 and a trailing edge reinforcing member 15. The outer structure 8 is composed of an upper surface skin 2, an upper surface leading edge cover 3, an upper surface trailing edge cover 4, a lower surface skin 5, a lower surface leading edge cover 6 and a lower surface trailing edge cover 7. The members 9 to 15 are arranged from the front side to the rear side of the interior of the outer structure 8.

The upper surface leading and trailing edge covers 3 and 4 and the lower surface leading and trailing edge covers 6 and 7 are all formed of a woven cloth having a base material of resin impregnated glass fiber. The main spar 9 and the trailing edge reinforcing member 15 are formed of a uni-directional material belt of a resin impregnated glass fiber produced by filament winding. The annular reinforcing member 12 and the vertical rib 13 are also formed of a woven cloth of a glass fiber material or a carbon fiber material instead.

The terms "upper" and "lower", and "leading or front" and "trailing or rear" used herein are based on the assumption that a rotrary wing made from the composite material blade according to the present invention is actually mounted to a helicopter.

The composite material blade manufacturing method according to the present invention will be described hereunder with reference to FIGS. 3 to 13.

Figure 3:
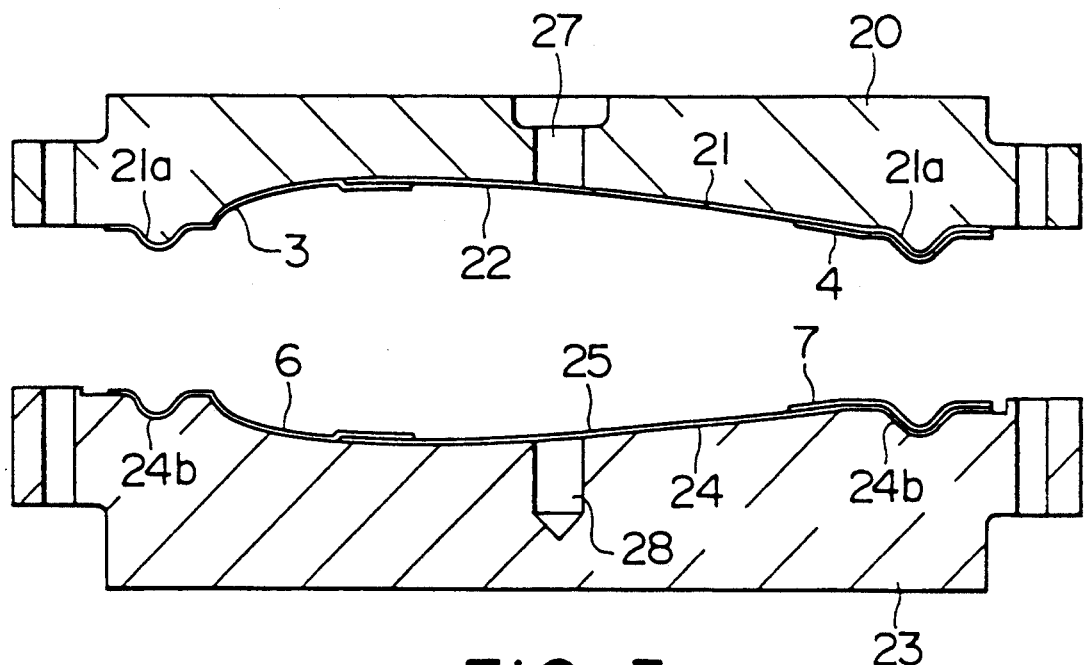
FIGS. 3 to 13 are views representing one embodiment according to the present invention showing a series of steps for manufacturing a composite material blade.
Figure 4:
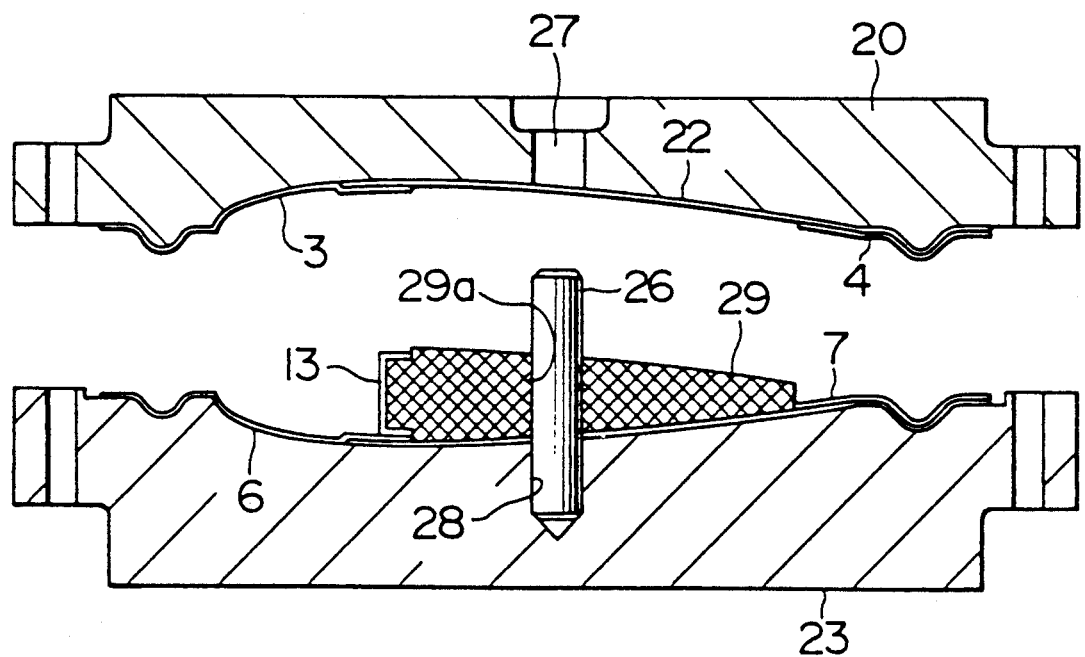
Figure 5:
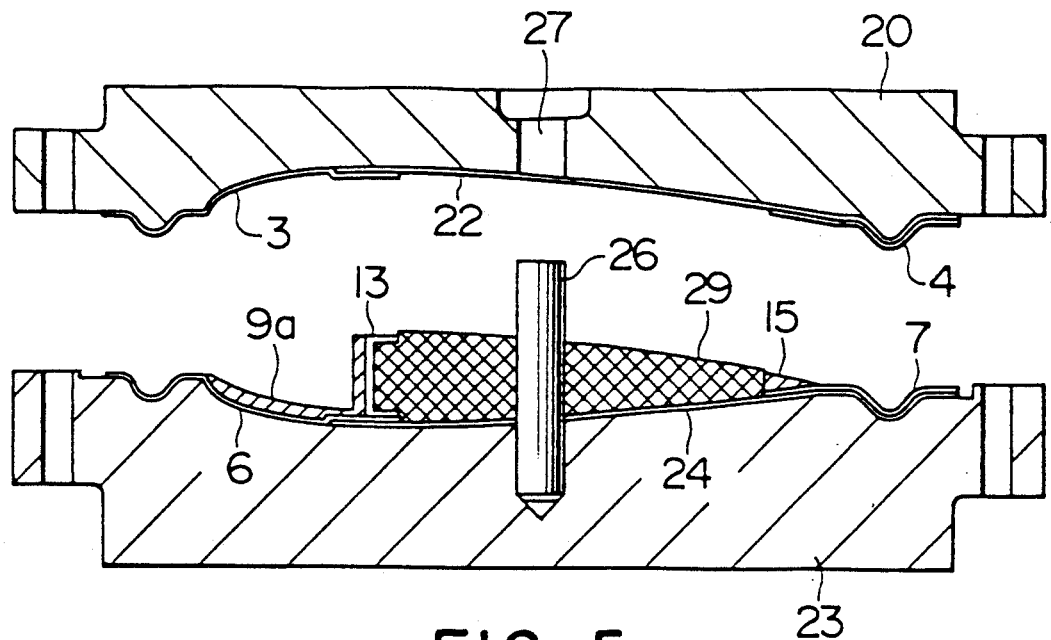
Figure 6:
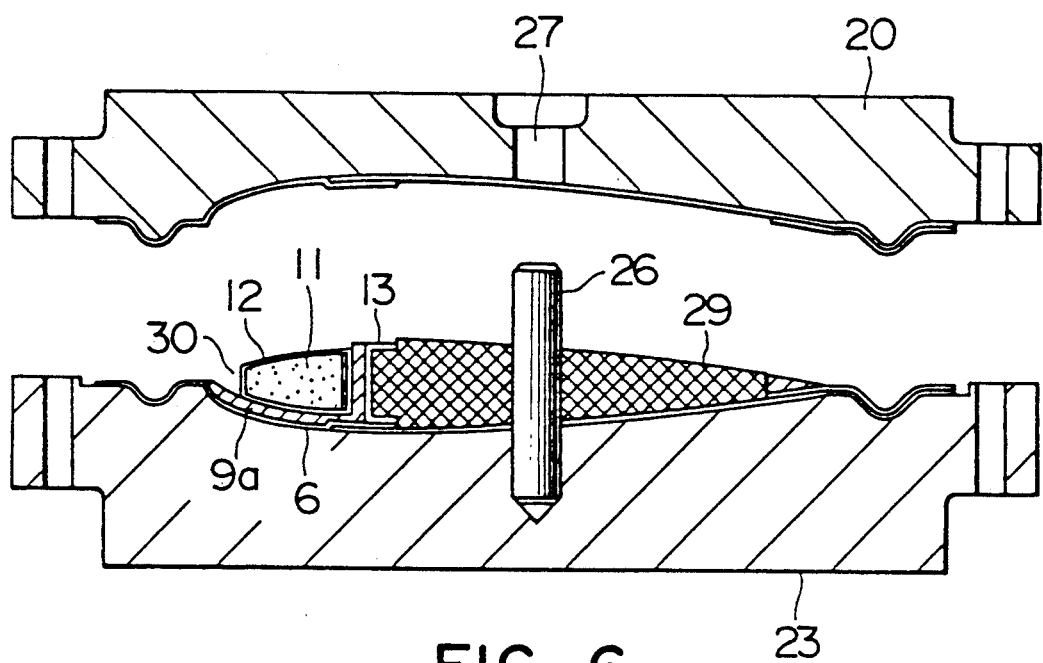
Figure 7:
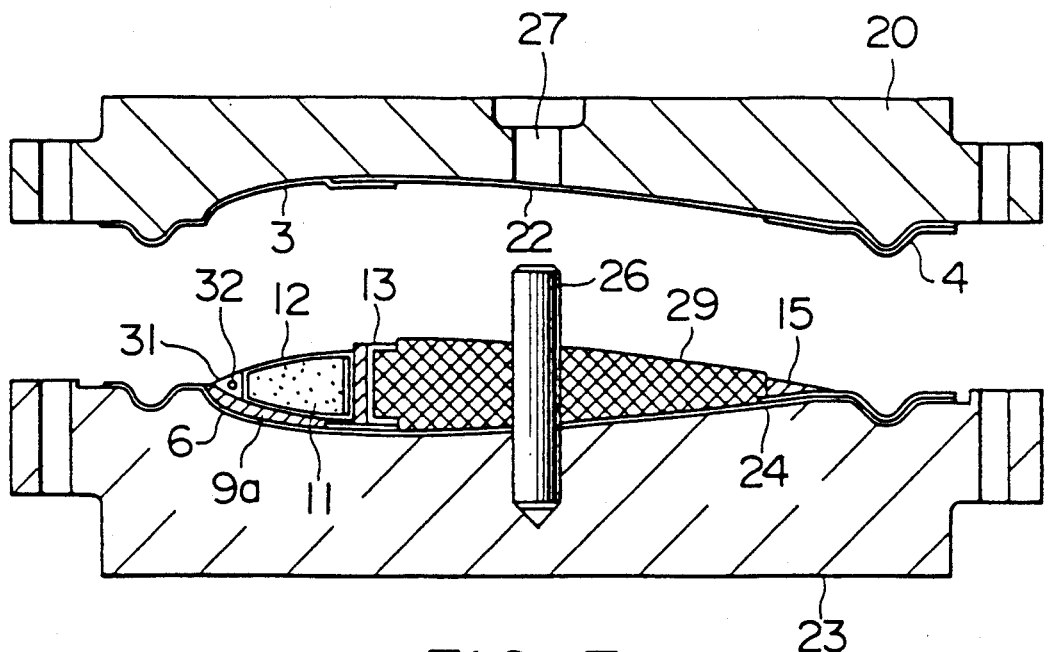

Referring to FIG. 3, a mold assembly is composed of an upper mold half 20 and a lower mold half 23 which are mated with each other when closed. The upper (as viewed) mold half 20 is provided with an inner molding surface 21 which is disposed on an upper dummy skin 22 made of a non-adhesive material and having a shape corresponding to the upper surface skin 2. The upper surface leading edge cover 3 and the upper surface trailing edge cover 4 are also disposed on the inner molding surface of the upper mold half 20 partially laminated on the upper dummy skin 22. The lower, as viewed, mold half 23 is also provided with an inner molding surface 24 which is disposed on a lower dummy skin 25 made of a non-adhesive material and having a shape corresponding to the lower surface skin 5. The lower surface leading edge cover 6 and the lower surface trailing edge cover 7 are also disposed on the inner molding surface 24 of the lower mold half 23 partially laminated on the lower dummy skin 25. Protrusions 21a and recesses 24b are formed on the molding surfaces 21 and 24 so as to mate each other when the upper and lower mold halves are engaged. Holes 27 and 28 are formed in the upper and lower mold halves 20 and 23 respectively for inserting a fixing pin 26 shown in FIG. 4. A dummy block 29 is also disposed on the lower dummy skin 25 as shown in FIG. 4.

The dummy block 29 is formed from a heat resisting material by a molding working so as to have an outer shape corresponding to the molding surfaces 21 and 24 of the mold halves 20 and 23. The preliminarily hardened vertical rib 13 is disposed to the front portion of the dummy block 29 in a state that the adhesive films, not shown, are bonded to upper, lower and front surfaces of the vertical rib 13. A positioning hole 29a is formed in the dummy block 29 so that the positioning hole 29a aligns with the fixing hole 28 of the lower mold half 23 when the dummy block 29 is positioned on the molding surface 24 of the lower mold half 23, whereby when the fixing pin 26 is inserted through the fixing hole 28 and the positioning hole 29a, the dummy block 29 can be fixed to the predetermined position of the lower mold half 23.

In the next step, the main spar 9 which is divided into two members is disposed so that a lower member 9a, as viewed in the drawings, of the main spar 9 contacts to the upper surface of the lower leading edge cover 6 secured to the lower mold half 23 and the front surface of the vertical rib 13. The lower member 9a of the main spar 9 is sticked at its lower surface to the lower leading edge cover 6 and at its rear surface to the front surface of the vertical rib 13. The trailing edge reinforcing member 15 is bonded to the rear surface of the dummy block 29 and to the lower surface trailing edge cover 7. The annular reinforcing member 12 with the core made of an epoxy foaming material is disposed on the lower member 9a of the main spar 9 to form a space 30 between the annular reinforcing member 12 and the lower member 9a of the main spar 9. In the space 30 there is arranged a leading edge block 31 formed of a unidirectional material band of a resin impregnated glass fiber produced by filament winding. A balance weight 32 will be embedded in the leading edge block 31 for keeping the balance of the blade member, as occasion demands.

Figure 8:
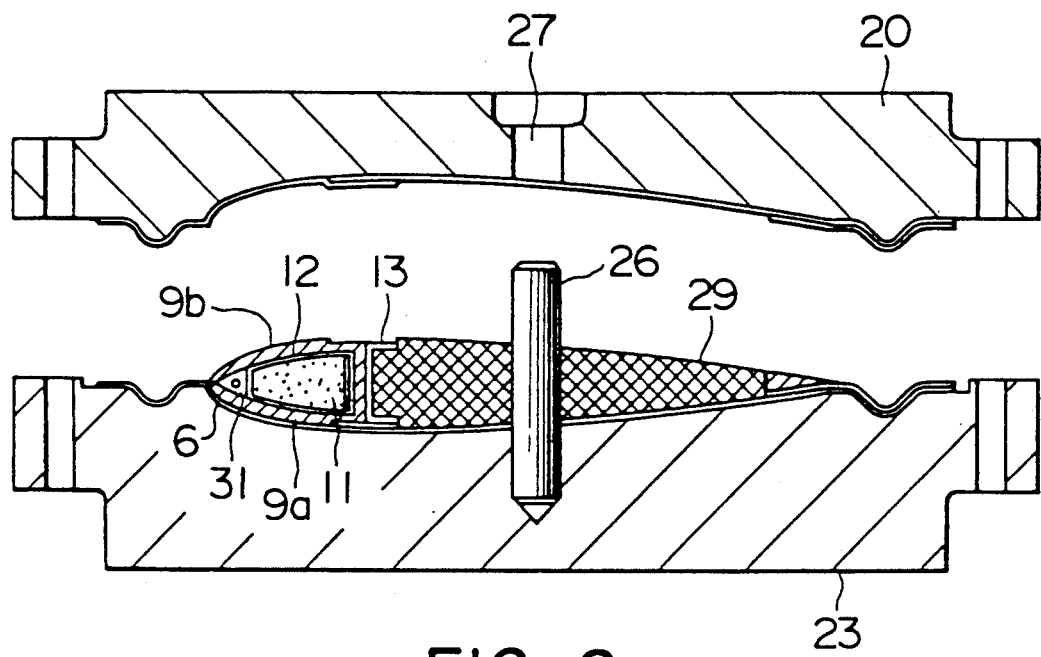

After the arrangement of the leading edge block 31 has been completed, an upper member 9b of the main spar 9 is mounted on the leading edge block 31 as shown in FIG. 8, thus completing the arrangement of all the members constituting the composite material blade.

Figure 9:
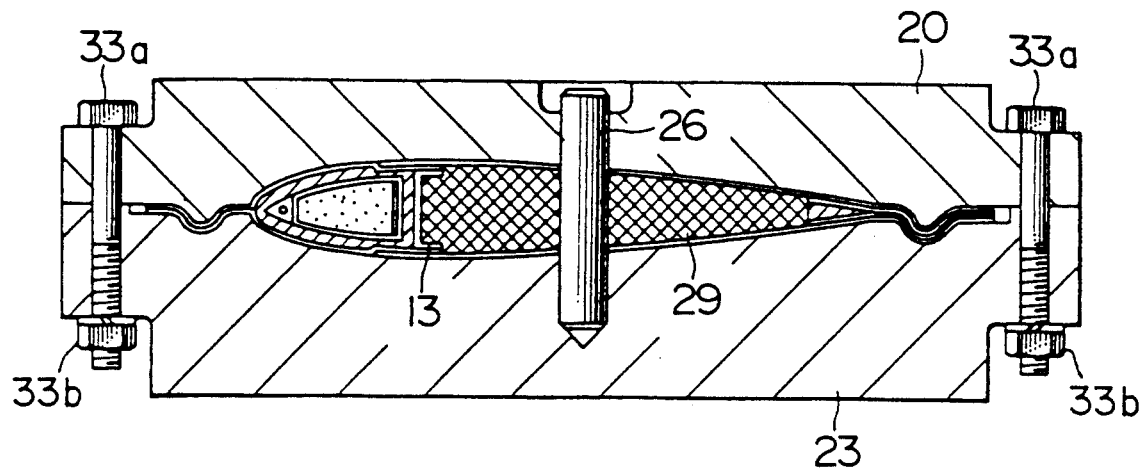

After the confirmation of the arrangement of all the members described above, the upper and lower mold halves 20 and 23 are closed while inserting the fixing pin 26 into the hole 27 formed in the upper mold 20, as shown in FIG. 9. The upper and lower mold halves 20 and 23 are fixedly combined by bolts 33a and nuts 33b. The mold assembly thus composed is thereafter subjected to the thermo-setting treatment for a predetermined time.

Figure 10:
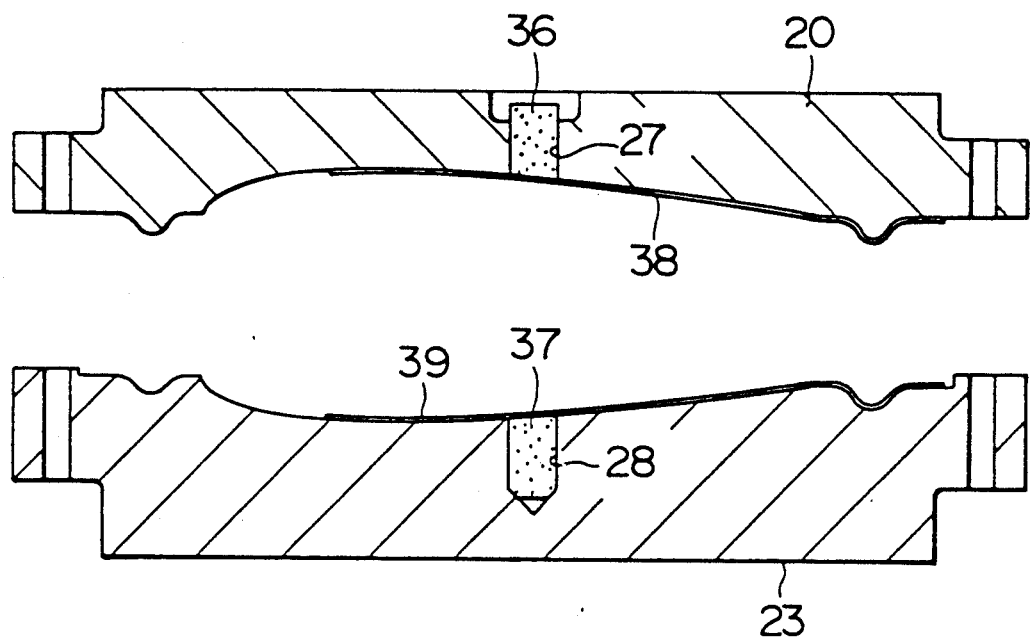
Figure 11:
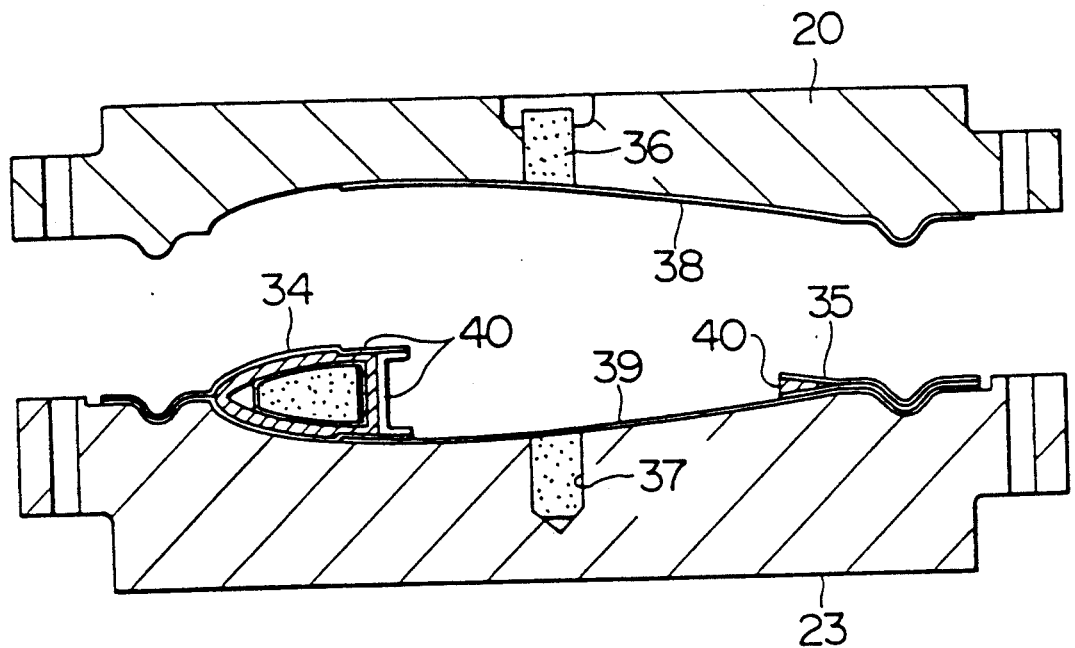

After the completion of the thermo-setting treatment, the bolts 33a and nuts 33b are loosened and removed to open the mold halves 20 and 23 and to take out a molded leading edge assembly 34 and a trailing edge assembly 35. At the same time, the non-adhesive upper surface dummy skin 22 disposed on the molding surface 21 of the upper mold half 20, the non-adhesive lower dummy skin 25 disposed on the molding surface 24 of the lower mold half 23 and the dummy block 29 are removed from the opened mold assembly. In the next step, as shown in FIG. 10, an upper plug 36 and a lower plug 37 are inserted into the fixing holes 27 and 28 of the upper and lower mold halves 20 and 23. An upper skin 38 and a lower skin 39 are then disposed on the molding surfaces 21 and 24 of the upper and lower mold halves 20 and 23, respectively. After the completion of these workings adhesive films 40 are bonded to the surfaces of the leading and trailing edge assemblies 34 and 35 to which other members are to be bonded and then the once removed leading edge assembly 34 and the trailing edge assembly 35 are again arranged on the predetermined positions of the molding surface 24 of the lower mold 23, as shown in FIG. 11.

Figure 12:
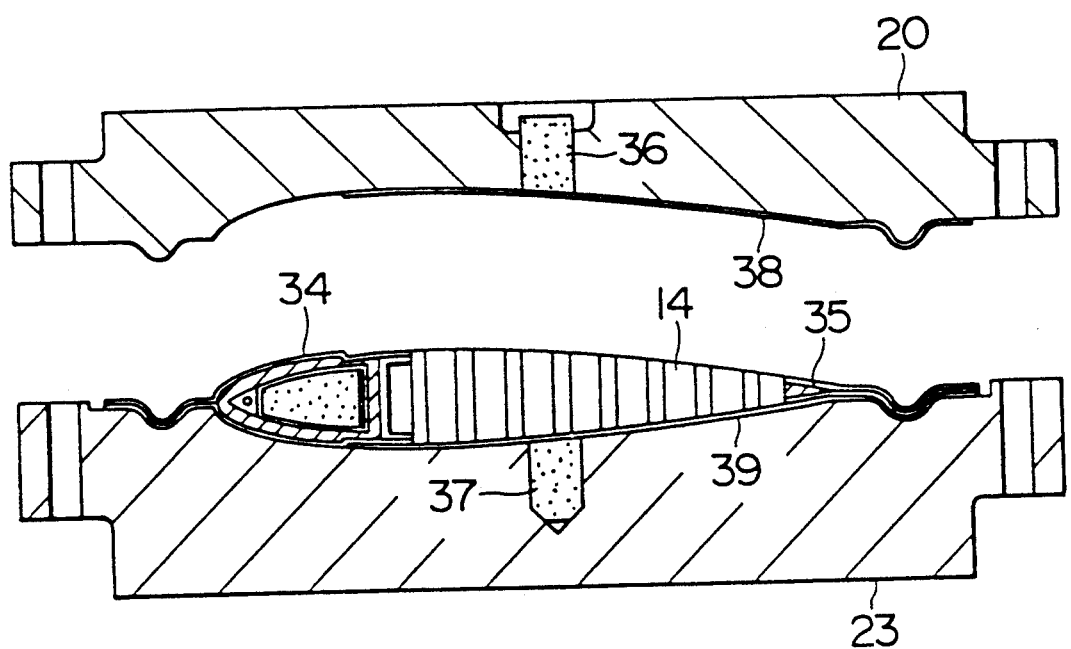
Figure 13:
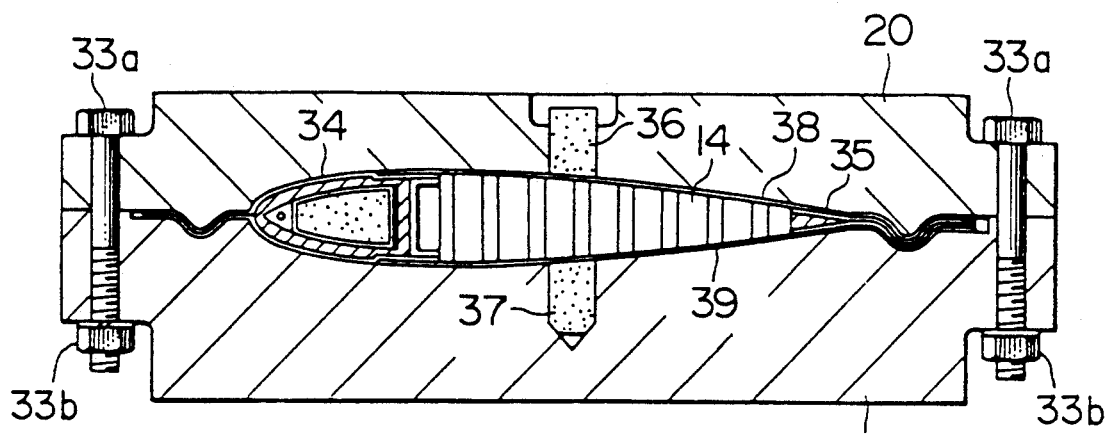

An aramid core member 14 of low density is then arranged on a predetermined position of the molding surface 24 of the lower mold half 23 as shown in FIG. 12 and the upper and lower mold halves 20 and 23 are closed by the bolts 33a and nuts 33b. Thereafter, the closed mold assembly is subjected to the thermo-setting treatment for a predetermined time.

As described hereinbefore, according to the present invention, the composite material blade can be manufactured by two series of steps by utilizing one mold assembly composed of the upper and lower mold halves.

Namely, in the first series of steps, the dummy block utilized in place of the actual core is temporarily arranged to the predetermined position in the mold assembly, whereby the members or assemblies arranged at the leading and trailing edge portions of the mold assembly can be prevented from being pushed in the central direction of the rotary wing by the compression force of the mold assembly after the mold halves are closed, thus forming the product with desired dimensions and shapes.

In the second series of steps, the dummy block is removed and the desired core is instead arranged and the whole structure molding operation is then performed, however, the leading and trailing edge assemblies are positioned by the engagement between the projections and the recesses formed at the leading and trailing edge portions of the mold halves, so that these assemblies can be precisely fixed in the mold assembly and the core cannot be crushed during the thermo-setting treatment.

In an actual molding operation, it may be desired to work the core so as to have dimensions slightly larger than those of the product because the core bites the skins by vertical compression force caused when the mold is closed, thus preventing the core from sliding.

Figure 14:
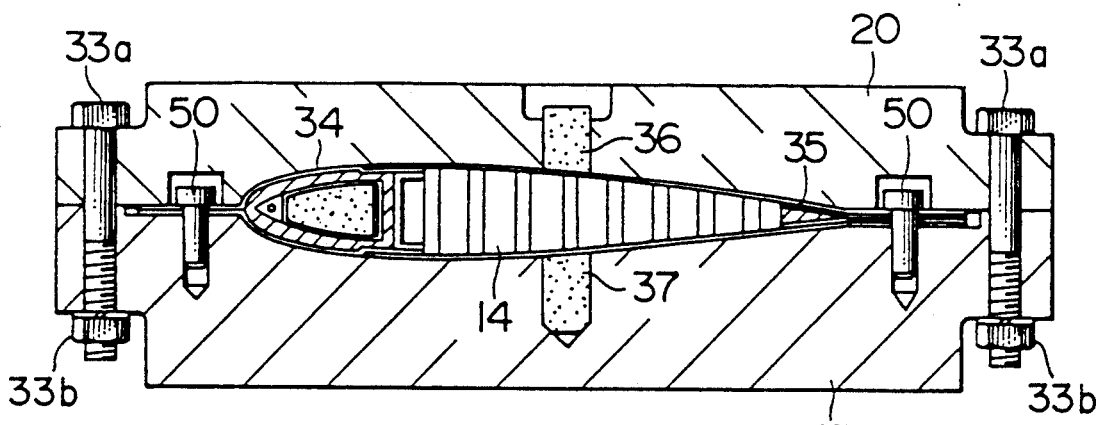
FIGS. 14 to 16 are views representing other embodiments of composite material blades according to the present invention.
Figure 15:
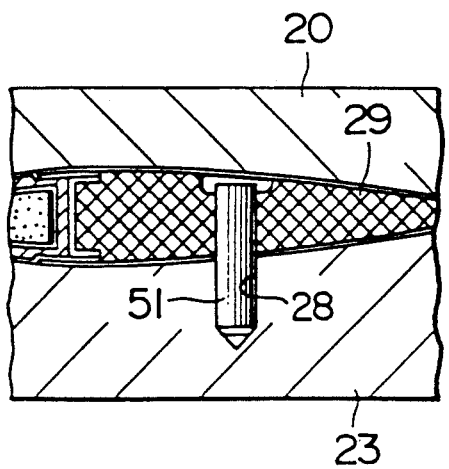
Figure 16:
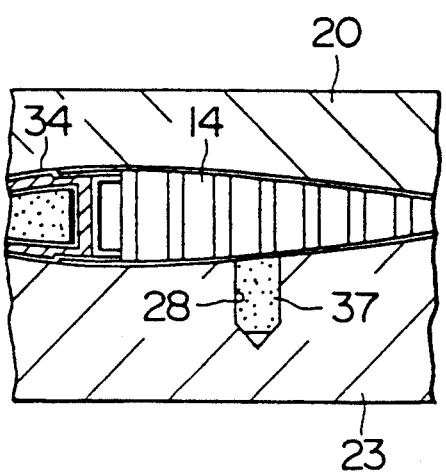

FIGS. 14 to 16 represent other embodiments according to the present invention, in which the projections and the recesses are not formed at the leading and trailing edge portions of the mold halves and bolts 50 and 50 are instead located to prevent the displacement of the leading and trailing assemblies arranged to the leading and trailing edge portions of the mold assembly.

In the embodiment shown in FIG. 15, the fixing hole 28 is formed only in the lower mold half 23 to secure the dummy block 29 to the predetermined position by inserting a fixing pin 51 into the hole 28.

In the embodiment shown in FIG. 16, the fixing hole is formed only in the lower mold half 23 to secure the dummy block 29 to the predetermined position by inserting a lower plug 37 into the hole 28.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method of manufacturing a blade member constituted by composite materials comprising the steps of:
   preparing a mold assembly provided with an upper and a lower mold halves, each having an inner molding surface;
   disposing an upper dummy skin, an upper surface leading edge cover and an upper surface trailing edge cover on the molding surface of the upper mold half;
   disposing a lower dummy skin, a lower surface leading edge cover and a lower surface trailing edge cover on the molding surface of the lower mold half;
   disposing, on the lower dummy skin between the lower surface leading edge cover and the lower surface trailing edge cover, a dummy block provided with a preliminarily hardened vertical rib on the front end thereof and having an outer shape corresponding to the molding surface of the lower mold half;
   joining a lower member of a spar to the lower surface leading edge cover and the vertical rib and joining a trailing edge reinforcing member to the lower surface trailing edge cover;
   disposing an annular reinforcing member and a leading edge block on the lower member of the spar and disposing an upper member of the spar on the annular reinforcing member and the leading edge block;
   closing the upper and the lower mold halves to perform thermo-setting treatment to the closed mold assembly;
   opening the mold assembly;
   changing the upper dummy skin on the molding surface of the upper mold half to an upper surface skin;
   changing the lower dummy skin and the dummy block on the molding surface of the lower mold to a lower surface skin and a core member, respectively; and
   closing the upper and lower molding halves to perform thermo-setting treatment to the closed mold assembly.

2. The method according to claim 1, wherein the upper and lower dummy skins and the dummy block have a non-adhesive property.

3. The method according to claim 1, wherein the upper and lower mold halves are provided with fixing holes aligned with each other when the upper and lower mold halves are closed, the dummy block is provided with a through hole in alignment with the fixing holes when the upper and lower mold halves are closed, and a fixing member is inserted into the fixing holes and the through hole after the upper and lower mold halves are closed and fixed.

4. The method according to claim 3, wherein said fixing member is a pin.

5. The method according to claim 3, wherein said fixing member is a plug.

6. The method according to claim 1, wherein the lower mold half is provided with a fixing hole, the dummy block is provided with a vertical hole which is aligned with the fixing hole of the lower mold half when the dummy block is disposed on the molding surface of the lower mold half and a fixing member is inserted into the fixing holes of the lower mold half and the dummy block.

7. The method according to claim 1, wherein one of the molding surfaces of the upper and lower mold halves is provided with projections and the other one thereof is provided with recesses, said projections and said recesses engaging when the upper and lower mold halves are closed.

8. The method according to claim 1, wherein the upper and lower mold halves are firmly engaged by bolts and nuts when said upper and lower mold halves are closed.

9. The method according to claim 1, wherein the upper surface leading and trailing edge covers and the lower surface leading and trailing edge covers are formed of woven cloth made of resin impregnated glass fibers.

10. The method according to claim 1, wherein the annular reinforcing member is provided with a core made of a foaming material.

11. The method according to claim 1, wherein the dummy block is made of a heat resisting resin material.

12. The method according to claim 1, wherein the leading edge block includes a balance weight for keeping the balance of the blade member.

* * * * *